United States Patent Office 2,892,866
Patented June 30, 1959

2,892,866
IMPROVEMENT IN THE METHOD FOR THE MANUFACTURE OF NITROBENZENE-SULFONATE

Adnan A. R. Sayigh, West Haven, Conn., assignor to The Carwin Company, North Haven, Conn., a corporation of Connecticut No Drawing. Application December 11, 1957
Serial No. 701,962

2 Claims. (Cl. 260—505)

This invention relates to the manufacture of salts of 2,4-dinitrobenzenesulfonate.

The synthesis of sodium 2,4-dinitrobenzenesulfonate by the reaction between sodium sulfite and 2,4-dinitrochlorobenzene has been diclosed by Fierz-David and Blangey in "Fundamental Process of Dye Chemistry," 1949, p. 103. In this process, the 2,4-dinitrochlorobenzene is dissolved in an aqueous alcoholic solution and to the solution thus formed there is added an equi-molecular quantity of $SO_2$ in the form of a saturated sodium sulfite solution. Enough sodium hydroxide is added to cause the disappearance of the yellowish color and give a faint red coloration with phenolphthalein paper, indicating a pH in the region of 8.5. The mixture is heated to boiling for a time to permit the reaction to take place and the sodium salt of dinitrobenzenesulfonic acid is separated by known procedures.

The product prepared by the known method described has been found to be of poor quality due to the presence of highly colored (often dark orange) impurities which are very difficult to remove by ordinary washing and recrystallization procedures due to the similarity of their properties to those of the desired product. Moreover, for the surface treatment of aluminum prior to painting, the impurities cause difficulties and very often make the 2,4-dinitrobenzenesulfonate unacceptable.

One object and advantage of the present invention lies in providing an improved method for making salts of 2,4-dinitrobenzenesulfonic acid that are much purer than those heretofore produced by known procedures.

Other objects and advantages of the invention will appear from the following description.

According to the present invention, 2,4-dinitrobenzenesulfonates are prepared by reacting 2,4-dinitrochlorobenzene in solution with an alkali metal sulfite in the manner heretofore disclosed in the prior art, but there is incorporated in the reaction mixture an alkali metal bisulfite in an amount sufficient to maintain the pH of the reaction mixture below 7.5. By controlling the pH as described, a substantially purer product is obtained and the objects and advantages of the invention are thereby realized.

The particular alkali metal sulfite and bisulfite that are incorporated in the reaction mixture will depend upon the alkali metal dinitrobenzenesulfonate that is desired. Frequently, it will be desired to produce the sodium salt, and hence in one embodiment of the invention the sodium sulfite and bisulfite are employed and the reaction product obtained is the sodium salt of 2,4-dinitrobenzenesulfonate.

Since the reaction is believed to take place in solution, and since the 2,4-dinitrochlorobenzene has a limited solubility in water, but a significant solubility in many organic solvents, a quantity of water-soluble organic solvent that will dissolve the 2,4-dinitrochlorobenzene is mixed with the water to form a reaction medium. Such a reaction medium therefore will partly dissolve both reactants, i.e., the sulfite-bisulfite, which is inorganic, as well as the 2,4-dinitrochlorobenzene. For reasons of economy and convenience methanol is frequently used in the form of its aqueous solution as the reaction medium. However, the process of the invention is not limited to methanol because other organic solvents which will fulfill the criteria stated above may be utilized.

The amount of alkali metal sulfite employed is preferably at least an equi-molecular amount based upon the dinitrochlorobenzene. Amounts somewhat in excess of equi-molecular are preferably employed. Lesser amounts will result in incomplete conversion of the dinitrochlorobenzene to dinitrobenzenesulfonate with consequent lower yields.

The amount of bisulfite added to the reaction mixture is sufficient to produce and maintain the pH not above 7.5. Preferably the amount of bisulfite incorporated is a quantity which will produce a pH in the approximate range 6.0 to 7.0. Although larger quantities of bisulfite may be used, with resulting pH's below 5.5, the quantity of bisulfite and the corresponding pH is preferably maintained not below 5.5.

The method of the invention may be carried out by forming a solution of the nitrochlorobenzene in the aqueous organic solvent and adding thereto the alkali metal sulfite and alkali metal bisulfite in an amount sufficient to produce a pH of the mixture below 7.5 or preferably in the narrower range described above. The mixture is stirred and heated at a temperature and for a time to bring about the reaction. Generally the mixture will be refluxed using suitable apparatus as the reaction proceeds. The product is preferably filtered while hot to remove insoluble material, then cooled, filtered and sucked dry to recover the product as a filter cake.

The following examples illustrate how the invention may be carried out, but the invention is not limited to the specific procedures described.

Example 1

In a 2 liter flask, equipped with a mechanical stirrer, condenser, and thermometer, there are placed 202 grams (1 mol) of 2,4-dinitrochlorobenzene (M.P. 48° C.), 500 ml. of methanol, 149 grams of technical grade sodium sulfite (93% assay), 14 grams of technical grade sodium bisulfite (97–98% assay) and 500 ml. of tap water. The pH of the sodium sulfite-bisulfite is 6–7. The reaction mixture is stirred and heated to reflux for 70 minutes, effectively 35–45 minutes of reflux time. It is then filtered while it is hot to remove insoluble salts and cooled with an ice bath to 10° C. The light yellow solid precipitate is filtered, sucked dry and finally dried in the air at room temperature. The weight of the product is 240 grams representing an 84% yield. The pH of the filtrate ranges between 6.5 and 7.

Example 2

The procedure described in Example 1 was repeated except that sodium sulfite analytical reagent and sodium bisulfite analytical reagent were used in place of the technical grade reagents. The quantity of sodium sulfite was 139 grams and the quantity of sodium bisulfite was 13.0 grams. The pH of the mixture again was 6–7. The product was light yellow and was obtained in 84% yield.

The material obtained in Examples 1 and 2 is completely soluble in water and forms a light yellow solution which does not change its color with change in pH. It is found to be satisfactory in the surface treatment of aluminum for painting purposes. This is in contrast with the material produced by the procedure described by Fierz-David et al. in the publication referred to above.

Although specific embodiments of the invention have been described, it will be apparent to those skilled in the art that there are many modifications and equivalents within the scope of the invention. Broadly, it is contemplated that the starting materials in addition to 2,4-dinitrochlorobenzene which may be treated with the sulfite-bisulfite to produce the corresponding sulfonate include those which respond to the following structural formula:

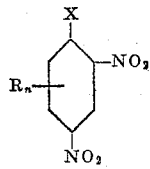

wherein X represents halogen such as bromine or iodine that is capable of being replaced with the sulfonic group by the reaction with sulfite, R represents aliphatic or aromatic substituents (preferably aliphatic such as methyl) on the ring which do not interfere with the replacement of the halogen by the sulfonic radical (or a second halogen in the 6 position, only), and $n$ is an integer in the range 0 to 3.

I claim:

1. In the method of preparing an alkali metal 2,4-dinitrobenzenesulfonate by reacting 2,4-dinitrochlorobenzene in solution with an alkali metal sulfite, the improvement which comprises incorporating an alkali metal bisulfite in said solution in an amount sufficient to maintain the pH of the reaction mixture in the range 6.0–7.0.

2. The method of claim 1 wherein the alkali metal sulfite is sodium sulfite and the alkali metal bisulfite is sodium bisulfite.

No references cited.